United States Patent Office 3,236,897
Patented Feb. 22, 1966

3,236,897
PROCESS FOR UTILIZING UNREACTED GASES CONTAINING OLEFIN AS THEY ARE OBTAINED IN THE OXIDATION OF OLEFINS TO ALDEHYDES, KETONES AND ACIDS
Lothar Hörnig, Wilhelm Riemenschneider, Ulrich Schwenk, Erhard Weber, and Heinz Steinrötter, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 22, 1959, Ser. No. 861,197
Claims priority, application Germany, Dec. 27, 1958, F 27,381, F 27,382
The portion of the term of the patent subsequent to Feb. 25, 1981, has been disclaimed
3 Claims. (Cl. 260—597)

The present invention relates to a process for utilizing unreacted gases containing olefin as they are obtained in the oxidation of olefins to aldehydes, ketones and acids. In several patent applications, for example U.S. patent applications Ser. Nos. 747,115 (now abandoned) and 747,116 (now U.S. 3,154,586), both filed July 8, 1958; Ser. No. 750,150, filed July 22, 1958 (now U.S. 3,122,586); Ser. No. 760,539, filed Sept. 12, 1958 (now U.S. 3,057,915); Ser. No. 763,691, filed Sept. 26, 1958 (now abandoned); Ser. No. 765,272, filed Oct. 6, 1958 (now U.S. 3,104,263); Ser. No. 791,816, filed February 9, 1959 (now abandoned); Ser. No. 768,624, filed Oct. 21, 1958 (now abandoned); Ser. No. 770,007, filed Oct. 28, 1958 (now U.S. 3,076,032); Ser. No. 769,912, filed Oct. 27, 1958 (now U.S. 3,119,875); Ser. No. 769,554, filed October 27, 1958 (now abandoned); Ser. No. 848,531, filed October 26, 1959 (now abandoned); Ser. No. 853,454, filed November 17, 1959 (now U.S. 3,087,968); Ser. No. 853,453, filed November 17, 1959 (now abandoned); Ser. No. 855,975, filed November 30, 1959 (now U.S. 3,119,874); Ser. No. 859,636, filed December 15, 1959; Ser. No. 858,073, filed December 8, 1959 (now abandoned); and Ser. No. 843,783, filed Oct. 1, 1959 (now abandoned), there are described processes for oxidizing olefins to aldehydes, ketones and acids containing the same number of carbon atoms as the olefin, according to which the olefins are reacted in the gaseous or liquid phase with oxidizing agents in the presence of catalysts containing redox systems and advantageously noble metal salts. By these processes ethylene can be converted into acetaldehyde and acetic acid, while propylene yields preponderantly acetone and propionaldehyde, the butylenes yield methylethylketone, butyraldehyde or isobutyraldehyde, and butadiene yields diacetyl and crotonaldehyde.

As oxidizing agent, oxygen is advantageously used, if desired in the form of air or of air enriched with oxygen. The reactants may be used in the pure state or in the form of gas mixtures and may be introduced either in a premixed form or separately each through one or more inlets which may be disposed one after the other in the direction of flow. The olefins may be diluted, for example, with saturated aliphatic hydrocarbons, such as methane, ethane, propane, butane, isobutane or higher saturated aliphatic substances, cyclohexane, nitrogen, carbon dioxide, carbon monoxide and hydrogen, which are attacked by the aforesaid catalysts only partially if at all, or any mixture of these substances.

In the various forms of the aforesaid process, a gas mixture which contains the reaction products and possible by-products in the gaseous state besides residues of the olefins used as starting material, is generally obtained at elevated temperatures by passing the gaseous olefin through the reaction zone containing the catalyst, with or without the simultaneous addition or passing through of an oxidizing agent. In special cases in which a gaseous oxidizing agent such as oxygen or air is conducted through the reaction zone simultaneously with the olefin, a mixture is obtained which generally contains residues of oxidizing agent in addition to the aforesaid components.

In the aforesaid process it is in many cases, i.e. when no extreme reaction conditions are used, unadvisable for reasons of economy to convert the olefin completely into oxidation products since the space-time yields of the oxidation products decrease rapidly with decreasing olefin concentration. It is therefore often more economical not to convert all the olefin and to maintain a high yield per unit of time. The gas mixture leaving the reaction zone may then be freed from the oxidation products in known manner, for example by cooling or washing.

In the gaseous phase there finally remain olefin residues, residues of oxidizing agent if the latter has been used simultaneously with the olefin, and gaseous impurities which originate from the starting gases or have formed during the reaction. For example, commercial ethylene frequently contains relatively small portions of ethane or another saturated hydrocarbon which remains unchanged under the reaction conditions. When, for example, oxygen is used as oxidizing agent, a small content of nitrogen cannot be avoided. The nitrogen also remains unchanged on its passage through the reaction zone.

In the oxidation reaction small portions of impurities, for example carbon dioxide or chlorinated low paraffins, which can be traced in the gas after the reaction are formed by side reactions. If the content of impurities is small, the gas may be returned to the reaction after it has passed once through the reactor and the reaction products have been removed, and the consumed portions of olefins and oxidizing agent may be replaced, if desired.

After the gas has been cycled through the reactor several times, however, the concentration of the aforesaid impurities in the cycle gas may have increased to such an extent that the speed of the olefin oxidation reaction is impaired. It is then necessary to withdraw a part of the cycle gas from the cycle and to replace it by fresh gas in order to maintain the concentration of impurities below a determined value. This value is chosen from an economical viewpoint: the greater the volume of gas that is withdrawn from the cycle, the lower is the concentration of impurities in the cycle gas and the smoother is the olefin oxidation. On the other hand, as the volume of gas withdrawn from the cycle increases, the losses of olefin increase in cases in which the olefin is not recovered or, if an olefin recovery appears desirable, the costs of said recovery increase. In determining the volume of gas to be withdrawn the most advantageous middle course has therefore to be adopted in a given case.

It is in general of great interest from an economical viewpoint to utilize the relatively expensive olefins as completely as possible. For this purpose it is necessary to work up the gas portion withdrawn from the cycle or to recover the olefins. Similar problems arise in another known reaction for oxidizing olefins containing at least 3 carbon atoms with oxygen in the presence of catalysts, in which reaction, contrary to the aforesaid process, the olefin bond remains unchanged and compounds of the acrolein type are formed.

Now we have found that the gases which are obtained in the catalytic oxidation of olefins to aldehydes, ketones and acids having the same number of carbon atoms as the olefins and which contain unreacted olefins, can be utilized in a particularly advantageous and simple manner by freeing the gases leaving the reaction zone in known manner from the reaction products, washing the remaining gases or a part of these gases, thereby absorbing in the first place the carbon dioxide while any other gaseous substances which may not have participated in the reaction are also washed out, and/or chemically removing the olefins from the gases obtained by the separation of the reaction products, by oxidizing the olefins to aldehydes, ketones and/or acids in an acid to neutral medium in the presence of water or water vapor and of catalysts containing salts of noble metals of Group VIII of the Periodic Table and salts of metals which exhibit several stable valence stages and are at least monovalent in the reduced stage, or separating the olefins physically, and subjecting the separated olefins again to a reaction. The term "gas" is here intended to mean also vaporous substances. The process of the present invention is advantageously used for working up gas mixtures which are obtained in the oxidation carried out in the presence of catalysts containing redox systems and advantageously noble metal salts forming addition compounds or complex compounds with the olefin, i.e. salts of noble metals of Group VIII of the Periodic Table.

In general, the gas which has been withdrawn from the cycle and freed from the reaction products contains, in addition to olefin, also oxygen, inert gases such as saturated aliphatic hydrocarbons and nitrogen, carbon dioxide and other by-products formed in the catalytic reaction.

In the simplest case, the olefins present in the gas withdrawn from the gas cycle of the olefin oxidation can therefore be utilized completely by subjecting the gas that has been withdrawn to an appropriate washing carried out in known manner in order to remove the carbon dioxide which in the case of pure starting materials generally constitutes the largest portion of the impurities. By this procedure, part of the other impurities, especially chlorinated hydrocarbons such as methyl chloride, is also removed. The remainder of the gas may then be wholly or partially returned to the main cycle unless the remaining impurities do not considerably interfere with the olefin conversion.

The washing of the gases may be carried out, for example, with water under pressure, with alkalies, alkali metal carbonates, amines or taurine. More especially, there may be used as absorbents, for example methanol or other alcohols, ammonia, sodium hydroxide solution, potassium hydroxide solution, cold or hot sodium or potassium carbonate, amino acid salts, mono-, di- or triethanolamine, taurine, methyltaurine, mixtures of potassium carbonate with arsenious, selenious or tellurous acid. The olefins may be removed chemically or physically from the gases obtained after the separation of the reaction products; it is of particular advantage, however, to introduce the gas that has been withdrawn into a second reaction zone in which it is again oxidized in the presence of the aforesaid catalysts containing noble metal salts. This second olefin oxidation is, in general, advantageously carried out in a separate reactor which may be connected with the liquid cycle if the same catalysts are used. By proceeding in this manner, the temperature, pressure and contact time can be adjusted to the amount of olefin in a manner such that an almost 100% conversion of olefin is obtained. This means that independent of the conditions of the original olefin oxidation the most favorable, that is in general the most severe, conditions, for example higher temperatures and pressures can be chosen for the after-reaction. It is also possible to conduct the process in two stages, i.e. by carrying out the reaction and the regeneration of the catalyst separately, whereby the gas withdrawn from the cycle is contacted with a catalyst which has been pre-oxidized to as high an extent as possible; alternatively the necessary amount of oxygen may be introduced into the gas withdrawn from the cycle in order to utilize the olefin completely. Moreover, the efficiency of the catalyst may be increased by increasing the concentration of the active components, especially of the noble metal salts and the redox systems, which also favors a complete olefin conversion. Alternatively, a complete utilization of olefin may be achieved by using special mixed-phase processes, for example by carrying out the reaction in a flow tube which may contain fillers.

The application of these processes which are known per se from prior patent applications constitutes a special advance in the working up of the gases since in this manner a complete or almost complete olefin conversion can be obtained so that the remaining gas, after isolation of the oxidation products, contains only impurities or dilution gases and is therefore virtually valueless.

For this kind of working up the gas there may of course be used all modes of executing the oxidation of olefins to aldehydes, ketones and acids as they are described in prior patent applications, the variations referred to above being only mentioned by way of example. For a complete olefin utilization, it will be often necessary, however, to choose a mode of proceeding that involves higher costs of apparatus and operation than would be the case under more favorable reaction conditions. In the conversion of the olefins contained in the gases withdrawn from the main cycle, only comparatively small amounts are concerned, however, so that only small apparatus are needed which can still be manufactured in an economical manner in spite of the fact that they have to be made of expensive materials such as tantalum, titanium or corrosion-resistant titanium alloys containing at least 30% titanium, for example, in view of the danger of corrosion occurring during the operation under elevated pressure and temperature.

In the after-reactor the olefins, for example ethylene, propylene, butylene, isobutylene or pentene, which if desired are admixed with large quantities of inert gases, are oxidized with oxygen or gases containing oxygen in a neutral to acid medium in the presence of water or water vapor and solid, or advantageously liquid, catalysts containing redox systems and noble metal salts, to the corresponding aldehydes, ketones and/or acids corresponding to the aldehydes which have the same number of carbon atoms and in which the carbonyl oxygen is bound to a carbon atom of the olefinic bond. There are advantageously used catalysts containing salts of those noble metals of Group VIII of the Periodic Table which have a maximum stable valence of 4, for example ruthenium, rhodium, iridium, platinum and preferably palladium. As compounds which are capable of forming redox systems and are present in the catalyst, there may be used compounds of metals which exhibit several stable valence stages and are at least monovalent in the reduced stage. Exemplary of these compounds are salts of mercury, cerium, thallium, tin, lead, titanium, vanadium, antimony, chromium, molybdenum, uranium, manganese, iron, cobalt, nickel and preferably copper. In many cases it is especially advantageous to use catalysts which, besides palladium and copper compounds, also contain iron, chromium, manganese and/or cerium compounds. In many cases it is sufficient to use a ratio of copper:palladium of above 10:1, for example above 15:1, and advantageously up to 100:1 or even more, for example 50 to 500:1.

As anions there may be used, for example, halogen anions, such as bromine ions, advantageously chlorine ions or chlorate, perchlorate, nitrate or mixtures of such anions with sulfate or acetate groups.

In another advantageous form of the process of the present invention, catalysts containing chlorine ions are used and further anions, advantageously chlorine anions, are added during the reaction, for example in the form of hydrogen chloride or of compounds yielding chlorine ions, e.g. acetyl chloride, ethyl chloride, tertiary butyl chloride or bromotrichloride. In this case the ratio of copper:chlorine is advantageously adjusted to a range of 1:1 to 1:3, preferably 1:1.4 to 1:2.5, whereby the chlorine ions contained in neutral salts, such as sodium chloride, are not considered.

The pH is advantageously within the range of 0.8 to 5 but may be outside this range, if desired; it may be, for example, 0.5. The temperature advantageously amounts to 50 to 160° C. but it is not confined to this range. In special cases, for example when the reactants are conducted in turbulent flow through a flow tube, temperatures up to 250° C., and advantageously ranging from 150 to 220° C. may be used. The process of the invention is advantageously carried out under increased pressure, for example under a pressure of up to 100, and advantageously up to 50 atmospheres gage.

When the after-reaction is carried out in separate parts for the reaction and the regeneration, it is also possible to proceed in a manner such that a small portion of oxygen is already introduced into the reaction zone along with the olefins and the complete regeneration of the catalyst medium is carried out in a subsequent second stage. The catalyst may be regenerated under known conditions, for example at a temperature within the range of 50 to 150° C., and even at pressures and/or temperatures different from those used in the reaction stage. Pressure may be applied regardless of whether the process is carried out at a temperature above or below 100° C. At temperatures above 100° C. it is necessary to apply pressure or to add substances capable of increasing the boiling point. In the aforesaid two-stage process, it is often advantageous to use air as oxidizing agent in the regeneration stage since the remaining nitrogen is not admixed with the residual gas.

In some cases it is of advantage to vary the amounts of catalyst liquid cycled per unit of time through the two stages of the process, i.e. the reaction and the regeneration stages, independently of each other, that is the portion of catalyst liquid flowing per unit of time through the reaction zone is smaller than the portion flowing per unit of time through the regeneration zone or vice versa. This can be suitably achieved by returning determined quantities of catalyst liquid, after they have passed through the reaction or the regeneration zone, respectively, without an immediate further regeneration or reaction, into the reaction or regeneration zone by means of a smaller catalyst cycle derived from the main catalyst cycle, and mixing them with the main catalyst cycle before or in the zone concerned. If desired, the derived catalyst cycles may be admixed with the main catalyst cycles in the pipes through which the main cycles are introduced into the reaction or regeneration zone. The derived cycles may also be branched off, for example, from so-called quiescent vessels in which the gaseous fractions are separated from the liquid catalyst.

In many cases it may be advantageous to add a salt since in this manner the water vapor pressure of the catalyst solution is reduced and the reactivity, for example of copper chloride, is improved. There may be used, for example, the chlorides or acetates of lithium, sodium, potassium, ammonium, calcium, barium, magnesium or zinc, $FeCl_3$, $FeCl_2$ or salts of the named elements with other anions. With liquid catalysts, an additional solvent containing a hydrophilic group, may concomitantly be used, for example acetic acid, ethylene glycol, propylene glycol, glycerol, dioxan or mixtures of these substances.

The reaction may be carried out under the influence of active radiation, especially ultraviolet light, whereby it is particularly advantageous to irradiate the oxygen or the catalyst near the oxygen inlet.

To avoid certain disadvantages involved in the use of catalysts containing palladium salt, small portions of compounds of metals that are nobler than palladium may be added to the catalyst. It may also be of advantage in special cases to contact the gaseous or vaporous components leaving the catalyst with metals or metal alloys having fairly large surfaces and a potential in the electromotive series that is above −1.7 and below that of the noblest component of the catalyst.

It is also possible to charge the after-reactor exclusively or partially with a gas from which the carbon dioxide has been removed as described in the foregoing.

When the gases withdrawn from the cycle contain only a relatively small portion of olefins and higher concentrations of impurities that cannot or only partially be removed by a simple washing or a removal of which by washing entrains relatively high losses of olefin, it may be uneconomical to utilize the olefins completely or to a far extent in an after-reactor as described above. Similarly, when the volume of gas withdrawn from the cycle is only very small with a given apparatus, an after-reactor will in many cases not be profitable. In such cases and all other instances in which an after-reaction of the aforesaid kind is dispensed with for some reason or other, it will nevertheless be in the interest of economy to recover the olefin from the gas withdrawn from the cycle since the olefin is the most expensive of the components and is the component that is present in the largest quantity. The olefin which has been purified in any desired manner may then be returned to the fresh gas of the oxidation so that a 100% utilization of olefin is virtually obtained. If it is intended to recover the olefin in this manner, it has to be taken into account that in almost all known processes the oxygen contained in the gas is disturbing since the oxygen generally destroys the reagent absorbing the olefin by oxidation. Another disadvantage of the presence of oxygen is that explosive gas mixtures may form upon the washing out of the olefin since the oxygen content thereby increases considerably as compared with possible olefin residues and paraffins contained in the residual gas. A third reason the oxygen interferes with the recovery of the olefins is that the $O_2$-content renders a distillation of the olefin difficult or even impossible.

If it is desired to isolate the olefins in between, it is in most cases necessary first to remove the oxygen from the gas withdrawn from the cycle. This may be achieved in various known ways. For example, appropriate measures concerning apparatus and operation may already be taken in the main reactor of the olefin oxidation in order to obtain a complete or almost complete oxygen absorption by the catalyst solution. This may be achieved, for example, by an appropriate choice of the temperature, pressure, contact time and the amount of oxygen, the working up of the gas withdrawn from the cycle being simplified accordingly.

It is also possible to react the oxygen chemically selectively in known manner in order to obtain an oxygen-free residual gas for the further working up. In this case, it is particularly advantageous to use the residual oxygen for further oxidizing the aldehydes formed in the main reaction to the corresponding carboxylic acids. The gas mixture can be conducted over appropriate known oxidation catalysts, for example manganese acetate, with or without the use of a carrier, immediately after the main reaction whereby a corresponding amount of acid, for example acetic acid, is obtained in addition to acetaldehyde while the oxygen is almost completely utilized. After separation of the reaction products, the remaining gas mixture may be worked up as described in the foregoing and hereinafter.

If it is desired to avoid any losses of aldehyde, the latter may be separated or washed out as described above and the residual gas may be subjected to a partial combustion whereby a small portion of the hydrocarbons present is burnt with substantially the whole oxygen of the gas at an appropriate known catalyst such as copper oxide, manganese oxide, chromium oxide and mixtures of copper, manganese, chromium, cobalt and silver oxides which may be supported on a carrier. To save olefin, cheap readily oxidizable gases such as carbon monoxide or readily oxidizable organic compounds such as methane, ethane or other low paraffins may be added prior to the combustion, these substances being admixed in such a quantity and the combustion catalyst being adjusted in a manner such that as little of the olefin as possible is lost and the reaction products consist of substances that are easy to remove, for example carbon dioxide and water, and that the residues of the admixed combustion components do not interfere with the isolation of the olefin.

The residual gas which, if desired, has been freed from carbon dioxide and/or other components by a pre-washing, may be worked up to pure olefin in known manner. For this purpose numerous commercially useful processes are available: the residual gas may, for example, be liquefied and the olefin may be distilled off at a low temperature under a corresponding pressure or the olefins may be washed out selectively, for example with cuprous compounds, in an aqueous, acid or alkaline solution, for example in an acetate-containing or ammoniacal solution or in an amine or amino-alcohol solution or they may be separated in an aqueous solution with silver salts such as silver fluoborate, silver fluosilicate, silver nitrate or another well soluble silver salt, with mercury sulfate in a sulfuric acid solution etc., if desired with the application of pressure. The olefins may then be recovered from these agents by increasing the temperature of the solution and/or reducing the pressure, whereby a separating column may be inserted, if desired, between the absorption and desorption tower in order to obtain a complete purification.

If an oxygen removal is to be dispensed with, the olefin may be washed out of the gas withdrawn from the cycle by means of special washing agents which are stable to oxidation and the olefin may then be recovered from the solution by increasing the temperature and/or reducing the pressure. Formation of explosive gas mixtures can be prevented by adding nitrogen or another inert gas at the corresponding positions of the washing column. As solvent for this process, a solution of silver fluosilicate or silver borofluoride may, for example, be used with particular advantage.

The recovered, purified olefin is returned to the reaction as fresh gas so that in this case, too, a complete utilization of the olefin used as starting material is virtually achieved.

As already set forth in the foregoing, the gas withdrawn from the cycle also contains portions of chlorinated gases, preponderantly methyl chloride, for example 0.1 to 5% by volume, depending on the period of time for which the reisdual gas has already been cycled. However, the working up of the gas withdrawn from the cycle is already strongly disturbed if the gas contains the aforesaid amount of methyl chloride. When the gas withdrawn from the cycle is worked up, for example, with a solution of silver fluoborate, the methyl chloride undergoes a certain decomposition while silver chloride is formed so that a repeated regeneration of the silver salt solution is necessary. A similar decomposition occurs in an alkaline solution of cuprous compounds. Moreover, if the olefin oxidation forms part of a large petrochemical unit, it is impossible to conduct the gas containing methyl chloride to a central gas separation with subsequent pyrolysis of some gases since hydrogen halide which may cause considerable corrosion may be split off during the pyrolysis.

It has furthermore been found that the gas which has been withdrawn from the cycle can be obtained in an economical manner in a form substantially free from methyl chloride by washing the gas withdrawn from the cycle with water which advantageously flows in counter-current and using the wash water to which, if desired, a further amount of water may be added, for washing the carbonyl compound out of the cycle gas. In this manner all of the methyl chloride can be washed out. Washing out the methyl chloride with water has the further advantage that the gas withdrawn from the cycle is in any case completely free from the carbonyl compound formed. For the washing out of methyl chloride, only the necessary amount of wash water which can be easily determined by the expert is advantageously used since the carbon dioxide simultaneously contained in the gas should be retained as far as possible. It may be of advantage in special cases to wash the gas withdrawn from the cycle under slightly increased or reduced pressure so that just the methyl chloride contained in the gas is washed out while only about 30% of the carbon dioxide contained in the gas is returned to the cycle. The concentration of carbon dioxide in the cycle gas is thereby somewhat increased. The methyl chloride of the cycle gas is removed by the wash water which serves for isolating the carbonyl compound and recovered at the head of the column in which the carbonyl compound is separated from the water.

The following examples serve to illustrate the invention, but they are not intended to limit it thereto:

Example 1

In an ethylene oxidation plant for the fabrication of acetaldehyde in which ethylene is reacted under a pressure of about 3 atmospheres at 120° C. with oxygen by means of a catalyst containing, per liter, 2 grams palladium chloride, 34 grams $CuCl_2 \cdot 2H_2O$, 130 grams

$$Cu(CH_3COO)_2 \cdot H_2O$$

4.9 grams ferric chloride (anhydrous) and 50 cc. concentrated hydrochloric acid, there were obtained per hour about 5 m.³ gas withdrawn from the main cycle and containing 70 to 80% ethylene in addition to 6 to 9% oxygen and residual impurities ($CO_2$, $CH_3Cl$, $C_2H_6$, $N_2$). This gas was passed directly into a second, smaller reactor designed for pressures up to 25 atmospheres gage and consisting of a steel vessel the interior of which was protected against corrosion while the inlet and outlet pipes were made of titanium. The catalyst used in this reactor contained, per liter, 10 grams $PdCl_2$, 102 grams $CuCl_2 \cdot 2H_2O$, 260 grams $Cu(CH_3COO)_2 \cdot H_2O$, 147 grams $FeCl_3$ (anhydrous) and 100 cc. concentrated hydrochloric acid or, instead of ferric chloride, also chromic chloride. The volume of the catalyst solution, adjusted to an initial pH of 1.6, amounted to 80 to 100 liters. The reactor was built in the form of a high, slender tube.

The gas withdrawn from the main cycle, to which oxygen had been added, was passed in at the bottom of the reactor in a finely distributed form. Gas inlet pipes were installed in the wall of the reactor at several superimposed places through which, according to requirements, additional quantities of oxygen could be passed in. The reaction proceeded at a temperature of 140° to 150° C. under a pressure of 5 to 8 atmospheres. In the course of the reaction, relatively small quantities of gas were conducted into the reactor while the time of stay was rather high.

When the reaction was complete, there was left only about 1% of the ethylene that had been present in the gas. The reaction products were isolated in the usual manner; the residual gas, the further processing of which was not remunerative, was burnt off.

Example 2

The first stage of the process was carried out as described in Example 1. In the second stage there was used the after-reactor described in Example 1 which, however, was operated at a temperature of 120° to 130° C. under a pressure of 3 to 4 atmospheres while the catalyst, as compared with that of Example 1, was diluted in a ratio of 1:2. The catalyst and the gases remaining behind after the reaction products had been isolated were conducted in a cycle. In a continuous operation, 5 to 10% of this cycle gas was withdrawn. This gas contained only little ethylene the recovery of which was no longer interesting from an economical point of view.

Example 3

The gas withdrawn from the ethylene oxidation plant mentioned in Example 1 was passed into the reaction zone of a smaller two-stage ethylene oxidation plant. The reactor and the regenerator of this plant each consisted of a flow tube system made of titanium tubes in which there was circulated in a closed cycle about 0.5 m.³ per hour of an aqueous catalyst solution containing, per liter, 0.05 mol palladium, 2.06 mols copper, 4.4 mols chlorine and 30 grams acetic acid. The reaction volume amounted to about 12 liters, the regeneration volume to about 6 liters. The gas was passed into the reactor under a pressure of about 33 atmospheres gage at 160° C. The regenerator was charged with about 10 m.³ (measured at N.T.P.) per hour of air under a pressure of 35 atmospheres gage at 180° C. After having passed through the regenerator, the unreacted oxygen left the catalyst, together with the nitrogen, for the greater part by means of a degassing agent. The gaseous and/or vaporous portions of the catalyst leaving the reaction zone were expanded and separated from the catalyst liquid in a stripping column. In the upper part of the column the acetaldehyde obtained was separated by rectification from the residual gas being almost free from ethylene and oxygen. The residual gas was burnt off.

In this plant, about 7 kilograms per hour of acetaldehyde were obtained.

*Example 4*

In an acetaldehyde plant, in which 100 m.³ ethylene and 50 m.³ oxygen were introduced, per hour, in a cycle and in which 170 to 190 kilograms of acetaldehyde were obtained per hour, 5 to 10 m.³ of gas were continuously withdrawn from the main cycle; the remaining gases were cycled through the apparatus. After the acetaldehyde had been removed, the gas withdrawn from the main cycle had a composition of about 80% $C_2H_4$, 9% $O_2$, 5% $CO_2$, 0.5% chlorinated paraffins, predominantly methyl chloride, 2.5% $C_2H_6$ and 3% $N_2$.

In order to remove the oxygen, the required catalyst was first prepared:

154 kilograms $MnSO_4 \cdot 4H_2O$ and 126 kilograms $CuSO_4 \cdot 5H_2O$ were dissolved in 2 m.³ water and precipitated with $CO_2$. After suction filtration, the precipitated carbonates were washed with water until the wash water was free from sulfate. The filter cake was dried at 100° C. and crumbled; then air was passed over the filter cake at 300° C. for one hour, in the course of which operation there formed about 150 liters of a mixture of $MnO_2$ and CuO. This oxide mixture was mixed with 120 liters kieselguhr and 30 liters bentonite and formed into small sausages. About 135 liters of an operable catalyst were obtained.

In a contact reactor, there were passed over the catalyst thus obtained up to about 75 m.³/h. of the aforesaid gas mixture. The fresh catalyst became active at a temperature of about 160° C. However, the temperature had to be raised continuously until the catalyst, at a temperature of 280° to 290° C., operated without disturbance for several months. The gas now contained less than 0.1% of $O_2$. If the efficiency of the catalyst is reduced after a prolonged period of time, the catalyst can easily be regenerated by passing air or oxygen over it at a temperature of 400° to 500° C. The gas obtained after the elimination of oxygen was passed through a wash with alkanolamine, for example diethanolamine, which eliminated almost the total quantity of $CO_2$ and about two-thirds of the chlorinated paraffins. Part of the ethylene dissolved simultaneously and could partially be recovered by stripping. The residual gas had a composition of about 90% of $C_2H_4$, 0.3% of chlorinated paraffins, traces of $CO_2$ and $O_2$, about 4% of $C_2H_6$ and about 5 to 6% of $N_2$ and argon. This gas was passed at a temperature of 15° C. under a pressure of 3 atmospheres through a washing tower together with a cuprous salt solution containing ethanolamine and $NH_4NO_3$ whereby the ethylene and a small portion of the methyl chloride were washed out. In a small separate zone, the methyl chloride and the other physically dissolved impurities were expelled with part of the ethylene which was recycled into the washing column. In the desorption column operating under a reduced pressure of 0.5 atmosphere at 60° C., substantially pure ethylene was recovered. This ethylene could either be added to the fresh gas current of the olefin oxidation or be utilized in a different manner.

The losses of ethylene sustained in the course of the working up owing to the combustion and the wash amounted to about 10% of the ethylene which had been present in the gas.

*Example 5*

Under conditions which were similar to those described in Example 4 but without the addition of kieselguhr and bentonite, a catalyst was prepared for the combustion of oxygen. The catalyst formed had a somewhat lower capacity than the catalyst described in Example 4; when care was taken that the reaction heat was thoroughly eliminated, the maximum charge amounted to about 65 m.³/h.

The gas from which the oxygen was to be withdrawn, was mixed, prior to being introduced into the contact reactor, with 6% by volume of carbon monoxide. At an initial reactor temperature of 180° to 200° C. which had to be slowly increased after some time, the oxygen present was burnt until the oxygen content amounted to less than 0.1%. In the course of this operation there was lost less ethylene than described in Example 4 because the carbon monoxide added reacted preferably with the oxygen.

The combustion was followed by an alkali wash in order to remove the $CO_2$; in the course of this wash a large portion of the chlorinated hydrocarbons was also washed out. The residual gas which now only contained $C_2H_6$, $N_2$, argon, traces of $CH_3Cl$ and a small portion of carbon monoxide in addition to ethylene, was washed in a column with a solution of silver fluoborate. In the course of this wash, the ethylene was absorbed selectively by the solution; the ethylene was recovered in a pure form by desorption while the temperature was raised and/or the pressure reduced. The losses sustained in the course of the working up were somewhat smaller than those sustained when working according to Example 4.

*Example 6*

In laboratory tests, ethylene and oxygen were passed at 80° C. in the ratio of 40:10 l./h. per apparatus through vertical frit tubes filled with a catalyst solution containing, per liter, 2.0 grams $PdCl_2$, 34 grams $CuCl_2 \cdot 2H_2O$, 133 grams $Cu(CH_3COO)_2 \cdot H_2O$, 79 grams $CrCl_3 \cdot 6H_2O$ and 50 cc. concentrated hydrochloric acid, while the remainder was water. In the course of this reaction, 30% to 40% of the ethylene was converted to acetaldehyde. After the aldehyde had been washed out, 50 l./h. of the remaining gas of which 83% consisted of ethylene, 10% of oxygen, 1% of methyl chloride, 3% of nitrogen and 3% of carbon dioxide, were passed over 200 cc. of a pure copper oxide catalyst on a kieselguhr-bentonite carrier. After a starting period of a few hours, the catalyst operated satisfactorily at 280° to 300° C. for many weeks and yielded a gas mixture the oxygen content of which was below 0.1%. The gas which was free from oxygen was washed, without removal of $CO_2$, in a column at room temperature with a strongly acid (pH 1-2) saturated cuprous chloride solution containing ammonium chloride and magnesium chloride. The presence of $CO_2$ did not interfere with the operation. The saturated solution was freed from the dissolved ethylene in known manner; the ethylene could be returned to the olefin oxidation.

*Example 7*

After isolation of the acetone and propionaldehyde which had been formed, the gas withdrawn from the cycle of a propylene oxidation plant contained about 85% propylene, 7% $O_2$, 4% $CO_2$, traces of chlorinated paraffins, 2% propane and 2% $N_2$. This gas was directly subjected to a water wash under pressure by which the carbon dioxide and the small portions of chlorinated products were removed. In the course of the washing, part of the propylene used as starting material was lost. 80% of the residual gas was directly returned to the cycle of the olefin oxidation and only the remaining 20% was washed with an ammoniacal cuprous salt solution after $O_2$-combustion (analogous to one of the methods described in Examples 4 to 6) and removal of $CO_2$. After the washing with cuprous salt solution pure propylene was recovered which could be recycled to the oxidation process as fresh gas or used otherwise.

Example 8

The gas withdrawn from a plant for the production of acetaldehyde by oxidation of ethylene with oxygen in the presence of a catalyst containing palladium chloride, was first subjected to an oxygen combustion and then the carbon dioxide was washed out as described in Example 4. The residual gas was admixed with the gas flowing to a technical plant for separating gases by distillation. The ethylene contained in the gas withdrawn from the aforesaid plant for the production of acetaldehyde was thereby recovered almost quantitatively and could be used for any desired purpose.

Example 9

A reactor for the preparation of acetone filled with 600 liters catalyst containing, per liter, 60 grams copper, 20 grams chromium, 2.0 grams palladium (in the form of their chlorides) was charged under a pressure of 3 atmospheres gage at a temperature of 120° C. with 150 m.$^3$ per hour of cycle gas. The conversion was such that about 40 m.$^3$ (measured at N.T.P.) propylene and about 20 m.$^3$ (measured at N.T.P.) oxygen were absorbed per hour. 84 kilograms per hour of acetone were withdrawn from the reactor with the cycle gas which was washed with water. After being washed, the cycle gas contained about 70% propylene, 10% oxygen, 5% nitrogen, 5% propane, 9% carbon dioxide, while 1% was ethane, methyl chloride and argon.

To prevent the propylene concentration in the cycle from dropping below 70%, 4 m.$^3$ (measured at N.T.P.) of the cycle gas were withdrawn and conducted into a washing unit charged with silver fluoborate solution. Washing was carried out under normal pressure, 50 liters per hour of silver solution containing, per liter, 600 grams silver being used. After the absorption, the silver solution was passed through a boiler in which 2.8 m.$^3$ per hour of propylene of a purity of above 99% were recovered. The residual gas in the absorption column contained less than 1% propylene. The upper part of the washing column was continuously charged with nitrogen to prevent the residual gas from reaching the explosive limit. The propylene which had been recovered was admixed with the fresh propylene before the reactor.

Example 10

A mixture of n-butene-1 and oxygen saturated with water vapor was cycled at 90° C. over a solid catalyst consisting of palladium chloride and cupric chloride supported on silica gel, the methylethylketone formed being removed by washing after the mixture had left the contact reactor. Fresh butene and fresh oxygen were admixed with the cycle gas gradually as they were converted. After a starting period, such a volume of gas was withdrawn from the cycle that the cycle gas had the following constant composition: about 33% oxygen, 55% n-butene-1, 10% butane and 2% carbon dioxide. The gas withdrawn from the cycle was conducted through an explosion-proof low temperature cooler in which the $C_4$-hydrocarbons were separated by freezing out.

The liquid $C_4$-portions were subjected in a column to an extractive distillation using furfurol as solvent. At the head of the column a product of butane and $CO_2$ was obtained while the butylene was obtained in the sump together with the furfurol. In a separate column the sump product was worked up to pure butylene which was returned to the reactor cycle.

Example 11

A reactor filled with 600 liters catalyst containing, per liter, 60 grams copper, 20 grams chromium and 2 grams palladium (in the form of their chlorides) was used. 150 m.$^3$ per hour of cycle gas were circulated at 120° C. under a pressure of 3 atmospheres gage. About 50 m.$^3$ (measured at N.T.P.) of ethylene and 25 m.$^3$ (measured at N.T.P.) of oxygen had to be introduced per hour, in order to replace the gases which had undergone conversion. 88 kilograms per hour of acetaldehyde were formed. Such a volume of gas was withdrawn from the cycle that the following composition of the cycle gas was maintained: about 75% ethylene, 9% oxygen, 6% carbon dioxide, 2% chlorinated paraffins, preponderantly $CH_3Cl$, 4% nitrogen and argon and 4% ethane.

The gas withdrawn from the cycle was washed together with the acetaldehyde with water under a pressure of 3 atmospheres gage until substantially free from methyl chloride and carbon dioxide. Pure acetaldehyde was obtained from the wash water by distillation. The remainder of the gas withdrawn from the cycle was subsequently treated with 50 liters per hour of a silver fluoborate solution containing, per liter, 600 grams silver. The residual gas contained less than 1% ethylene. By adding nitrogen, formation of an explosive mixture was prevented in the upper part of the washing tower. The silver fluoborate solution with the absorbed ethylene was freed from the gas in vacuo. The ethylene was recovered in a purity of more than 99%, it could be returned to the oxidation cycle as fresh gas.

Example 12

An apparatus comprising a tube 3 meters high and having a capacity of 3 liters was charged at the lower end of the tube with 29 liters per hour of a mixture originating from an olefin oxidation unit and consisting of 22 liters ethylene, 2.2 liters oxygen and 4.8 liters gases that were inert with respect to the reaction, i.e. ethane and nitrogen, the said mixture being introduced in a finely distributed form into a catalyst solution containing, per liter, 3.0 grams palladous chloride, 120 grams cupric chloride containing crystal water ($CuCl_2 \cdot 2H_2O$) and 32 grams copper acetate. To regenerate the solution, 70 liters per hour of air enriched with 10% oxygen were introduced into the upper part of the tube. The liquid was cycled by the gas currents via a descending pipe. The temperature was, for example, 80 to 82° C. in the reaction zone and 80 to 86° C. in the regeneration zone. The ethylene used as starting material was substantially quantitatively consumed.

After adjustment of a constant acetic acid concentration, the acetaldehyde formed and the small portions of by-products were expelled with the residual gas and washed out in a washing tower, unless they were in the gaseous state, and worked up in known manner. The yield of acetaldehyde amounted to 90 to 97% of the theoretical.

Example 13

A reactor filled with 600 liters catalyst containing, per liter, 2 grams palladium, 50 grams copper and 10 grams trivalent chromium (in the form of their chlorides) was charged under a pressure of 3 atmospheres gage with 40 m.$^3$ (measured at N.T.P.) per hour of ethylene, about 20 m.$^3$ (measured at N.T.P.) per hour of oxygen and 150 m.$^3$ (measured at N.T.P.) per hour of cycle gas. The cycle gas contained 70% $C_2H_4$, 2.5% methyl chloride and 5% $CO_2$ in addition to other inert gases. The reaction gas was washed with 1000 liters per hour of water to remove 100 kilograms per hour of acetaldehyde which had been formed. 4 m.$^3$ (measured at N.T.P.) per hour of gas were removed from the cycle and washed in counter-current under a pressure of 3 atmospheres gage with the 1000 liters of water before the latter were used for washing out the acetaldehyde. The gas withdrawn from the cycle was substantially free from methyl chloride and contained 3% carbon dioxide. The methyl chloride and the aldehyde contained in the wash water were removed therefrom by distillation. Crude methyl chloride was obtained at the head of the same column in which the pure acetaldehyde was obtained. The gas so treated could be introduced, for example after removal of oxygen, into a unit for the working up of gases which was connected with a high temperature pyrolysis of liquid aliphatic hydrocarbons such as benzine.

We claim:

1. In a continuous process for the production of a carbonyl compound from an olefinic hydrocarbon, said carbonyl compound being selected from the group consisting of aldehydes and ketones corresponding to said olefinic hydrocarbon and containing one less olefinic bond than the olefinic hydrocarbon, by contacting, in a first reaction stage, a gas mixture containing said olefinic hydrocarbon and oxygen in the presence of water with a catalyst containing a salt of a metal selected from the group consisting of platinum, palladium, ruthenium, rhodium and iridium, and a salt of a multivalent metal, and then recovering the carbonyl compound produced to leave a residual gas containing unreacted olefinic hydrocarbon, the improvement of oxidizing the olefinic hydrocarbon present in said residual gas by treating said residual gas by said process in a separate second reaction stage operated at a higher pressure than said first reaction stage.

2. In a continuous process for the production of a carbonyl compound from an olefinic hydrocarbon, said carbonyl compound being selected from the group consisting of aldehydes and ketones corresponding to said olefinic hydrocarbon and containing one less olefinic bond than the olefinic hydrocarbon, by contacting, in a first reaction stage, a gas mixture containing said olefinic hydrocarbon and oxygen in the presence of water with a catalyst containing a salt of a metal selected from the group consisting of platinum, palladium, ruthenium, rhodium and iridium, and a salt of a multivalent metal, and then recovering the carbonyl compound produced to leave a residual gas containing unreacted olefinic hydrocarbon, the improvement of oxidizing the olefinic hydrocarbon present in said residual gas by treating said residual gas by said process in a separate second reaction stage operated at a higher temperature than said first reaction stage.

3. In a continuous process for the production of a carbonyl compound from an olefinic hydrocarbon, said carbonyl compound being selected from the group consisting of aldehydes and ketones corresponding to said olefinic hydrocarbon and containing one less olefinic bond than the olefinic hydrocarbon, by contacting, in a first reaction stage, a gas mixture containing said olefinic hydrocarbon and oxygen in the presence of water with a catalyst containing a salt of a metal selected from the group consisting of platinum, palladium, ruthenium, rhodium and iridium, and a salt of a multivalent metal, and then recovering the carbonyl compound produced to leave a residual gas containing unreacted olefinic hydrocarbon, the improvement of oxidizing the olefinic hydrocarbon present in said residual gas by treating said residual gas by said process in a separate second reaction stage wherein the contact time between the catalyst and the gas being treated is longer than in said first reaction stage.

References Cited by the Examiner

UNITED STATES PATENTS

| | | | |
|---|---|---|---|
| 2,775,601 | 12/1956 | Gardner et al. | 260—604 X |
| 2,913,505 | 11/1959 | Van Raay et al. | 260—677 |
| 2,941,007 | 6/1960 | Callahan et al. | 260—597 X |
| 3,122,586 | 2/1964 | Berndt et al. | 260—586 |
| 3,154,586 | 10/1964 | Bander et al. | 260—597 |

FOREIGN PATENTS 713,791 11/1941 Germany.

OTHER REFERENCES

Phillips: Amer. Chem. Jour., vol. 16, pages 255–77 (page 267 relied upon) (1894).

LEON ZITVER, *Primary Examiner.*

CHARLES B. PARKER, *Examiner.*